United States Patent
Liang et al.

(10) Patent No.: US 9,581,761 B2
(45) Date of Patent: Feb. 28, 2017

(54) CONTROLLING TEMPERATURES IN OPTICAL CIRCUITS

(75) Inventors: Di Liang, Santa Barbara, CA (US); Zhen Peng, Foster City, CA (US); Raymond G. Beausoleil, Redmond, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 49 days.

(21) Appl. No.: 14/423,804

(22) PCT Filed: Sep. 13, 2012

(86) PCT No.: PCT/US2012/055092
§ 371 (c)(1),
(2), (4) Date: May 27, 2015

(87) PCT Pub. No.: WO2014/042637
PCT Pub. Date: Mar. 20, 2014

(65) Prior Publication Data
US 2015/0277040 A1     Oct. 1, 2015

(51) Int. Cl.
*G02B 6/122*      (2006.01)
*G02B 6/12*       (2006.01)

(52) U.S. Cl.
CPC .... *G02B 6/122* (2013.01); *G02B 2006/12038* (2013.01); *G02B 2006/12135* (2013.01)

(58) Field of Classification Search
CPC .......... G02B 6/122; G02B 2006/12038; G02B 2006/12135
See application file for complete search history.

(56) References Cited

U.S. PATENT DOCUMENTS

| 5,841,931 | A | 11/1998 | Foresi et al. | |
| 6,347,106 | B1 | 2/2002 | Dijaili et al. | |
| 6,847,748 | B2 | 1/2005 | Benzoni et al. | |
| 6,912,362 | B1* | 6/2005 | Takiguchi | G02B 6/12007 385/24 |
| 6,999,652 | B2* | 2/2006 | Mino | G02F 1/31 385/129 |
| 7,020,374 | B2 | 3/2006 | Talin et al. | |
| 7,251,390 | B2 | 7/2007 | Fukai et al. | |
| 8,299,485 | B2* | 10/2012 | Celler | G02B 6/132 257/98 |
| 8,733,996 | B2* | 5/2014 | Kishimoto | B60Q 1/0011 362/553 |

(Continued)

FOREIGN PATENT DOCUMENTS

| JP | 2006243376 | 9/2006 |
| JP | 2010256552 | 11/2010 |
| WO | WO-2005083480 A1 | 9/2005 |

OTHER PUBLICATIONS

"Supplementary European Search Report" EP Appl. No. 12884528.6; mailed May 6, 2016; 8 pages.

(Continued)

*Primary Examiner* — John M Bedtelyon
(74) *Attorney, Agent, or Firm* — Fabian VanCott (57) ABSTRACT

Controlling temperatures in optical circuits includes using a device with a waveguide located between a base cladding and an over cladding. The base cladding is deposited over a substrate and the over cladding is made of a thermally conductive dielectric material.

18 Claims, 6 Drawing Sheets

(56) References Cited

U.S. PATENT DOCUMENTS

2005/0213916 A1    9/2005   Fukuda et al.
2008/0075413 A1    3/2008   Jen et al.
2009/0085056 A1    4/2009   Kumtornkittikul

OTHER PUBLICATIONS

Chao, F-L., Trench Structure Improvement of Thermo-optic Waveguides, (Research Paper), International Journal of Applied Science and Engineering, May 29, 2007, vol. 5, No. 1, pp. 1-5.
International Search Report & Written Opinion, Mar. 25, 2013, PCT Patent Application No. PCT/US2012/055092, 9 pages.

\* cited by examiner

CONTROLLING TEMPERATURES IN OPTICAL CIRCUITS

BACKGROUND

A refractive index of a material is a number that describes how light energy is propagated through that material. The refractive index is dependent on the wavelength propagated through it such that the refractive index may be different for varying wavelengths in the same material. Many transparent materials have a refractive index between 1 and 2. For example, air has a refractive index of 1, and water has a refractive index of 1.333.

Light transmitting materials may be used in circuit devices to relay information. For example, a core made of a transparent material with an appropriate refractive index may carry modulated light signals. Generally, the core has a refractive index that is higher than the refractive index of the cladding. In some cases, the core is made of silicon with a refractive index of 3.51 and the cladding is made of silicon dioxide with a refractive index of 1.46. Due to the phenomenon of total internal reflection where light tends to stay within materials with the higher refractive index, the core material acts as a wave guide that transmits optical signals.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

In examples where the core material is made of a semiconductor material, the optical characteristics of the core material may be changed with carrier concentration. For example, when an electric field moves the electrons and holes of the semiconductor material, the refractive index of the semiconductor material also changes. As the refractive index changes, the ability of the core material to guide light changes as well. Thus, an optical signal may be modulated by controlling an electric field within the proximity of the core material.

However, if such signal modulation with electric fields results in a circuit with current flow, it generates a temperature increase in the core material through joule heating. Generally, as long as there is current flow, inevitable electrical resistance in materials leads to heating. Heat dissipates towards cooler region, resulting in inconsistent temperatures along the optical pathway of the core. Such an inconsistency results is poor signal reliability and a degraded ability to modulate signals.

The principles described herein include a mechanism for distributing the temperature in and around the core material to reduce and/or eliminate the temperature variations. An optical device for controlling temperatures in optical circuits may include a waveguide located between a base cladding and an over cladding. The base cladding may be deposited over a substrate, and the over cladding may be made of a thermally conductive dielectric material.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
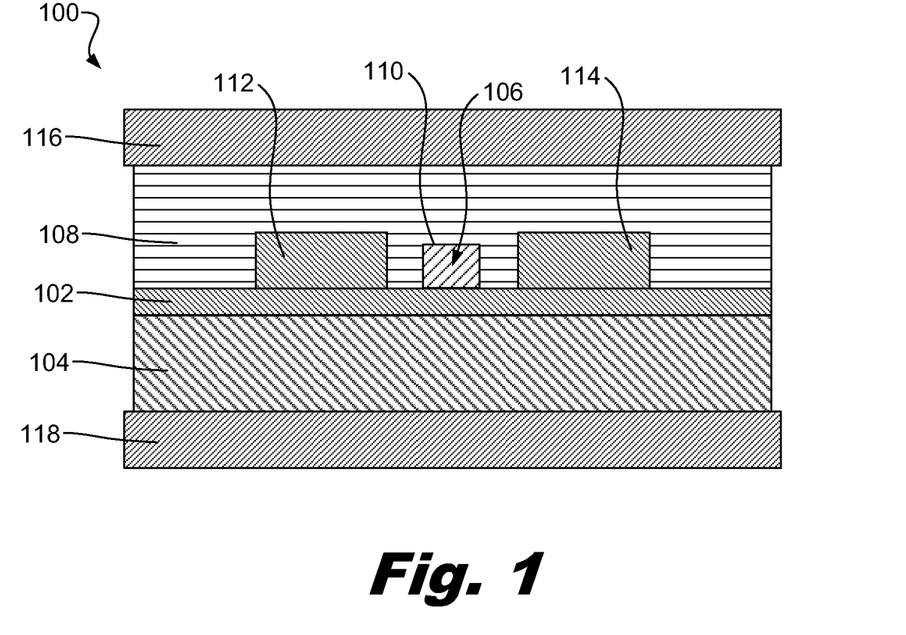
FIG. 1 is a diagram of an example of a circuit device according to principles described herein.

FIG. 1 is a diagram of an example of a circuit device (100) according to principles described herein. In this example, the circuit device (100) is an optical device that made to carry optical signals in an integrated circuit. The light may be generated with a light source and transmitted to another location by an optical bus, such as a waveguide structure (106). In response to arriving at its destination, the light may be converted into an electrical signal for processing.

In the illustrated example, the circuit device (100) has a base cladding (102) that is deposited on a substrate (104). In some examples, the base cladding (104) is made of a dielectric material such as silicon dioxide. In some examples, the base cladding (102) is at least one micron thick although any thickness may be compatible with the principles described herein.

In the illustrated example, a waveguide structure (106) is formed on the base cladding (102). The waveguide structure (106) may be made of a material that exhibits semiconductor properties. The waveguide's material may have a refractive index that is higher than the refractive index of an over cladding (108) that is deposited over the waveguide structure (106). In some examples, the waveguide's material has a refractive index that is greater than 3, while the over cladding (108) has a refractive index of less than 3. In some examples, the waveguide's material is made of silicon and has a refractive index of 3.51. In some examples where the over cladding (108) is made of diamond, the over cladding's refractive index is 2.383. In some examples where the over cladding (108) is made of aluminum nitride, the over cladding's refractive index is 2.124. Light may be prevented from leaking out of the waveguide structure (106) because the over cladding (108) may cover the entire exposed surface (110) of the waveguide's material. While the examples above have been described with reference to specific refractive index values, any refractive index values exhibited by the named materials may be compatible with the principles described herein.

Both the base cladding (102) and the over cladding (108) may be complementary metal-oxide semiconductor (CMOS) compatible materials. The over cladding (108) may be made of a dielectric material with a high thermal conductivity. In some examples, the over cladding material's thermal conductivity is at least a hundred watts per meter Kelvin (W/((m)(-K))). In some examples, the over cladding's thermal conductivity is higher than a thermal conductivity of silicon dioxide. In some examples, the over cladding (108) is made of diamond, aluminum nitride, beryllium oxide, another material, or combinations thereof. In some examples, the over cladding (108) is chemical vapor deposited, physical vapor deposited, vapor deposited, sprayed on, sputtered on, wafer bonded on, formed over the waveguide structure (106) with another mechanism, or combinations thereof.

In some examples, the circuit device (100) includes a mechanism for actively creating an electric field. In the example of FIG. 1, the waveguide structure (106) is located between a pair of electrodes (112, 114). The electrodes may be made of any suitable material including platinum, aluminum, silver, gold, copper, titanium, brass, palladium, metal oxides, other materials, or combinations thereof. In some examples, the electrodes (112, 114) are caused to have different electrical charges, and as a result, create an electric field between them to allow electrical carrier transportation. In examples where the waveguide structure (106) is made of a semiconductor material, electric fields may change the electrical and/or optical properties of the waveguide structure (106). For example, the electric field may inject or deplete electron and holes into or out of the semiconductor material of the waveguide structure (106), which may change the refractive index of the semiconductor material. As a result, an optical signal carried on the semiconductor material may be affected. Consequently, optical signals of the waveguide structure (106) may be modulated to carry messages.

In some examples, a side effect of subjecting waveguide structures (106) made of semiconductor material with current flow is joule heating. The portions of the waveguide structure (106) that are subjected to the electric fields may experience a temperature rise. A first heat sink (116) located adjacent to the over cladding (108) and a second heat sink (118) located adjacent to the substrate may draw out the temperature increase to keep the temperature along the waveguide structure (106) consistent. Temperature also affects the refractive index of the waveguide, thus, an inconsistent temperature of the waveguide structure (106) may adversely affect the ability to modulate optical signals.

The high thermal conductivity of the over cladding (108) may passively cause any temperature increase in the waveguide structure (106) to disperse quickly through the over cladding's volume. Diamond, for example, is a good heat spreader that quickly spreads any temperature change throughout its entire volume. As a result, diamond generally has a fairly uniform temperature that is substantially free of hot spots. As a result, in some examples, it is the high thermal conductivity of the over cladding (108), and not the heat sinks (116, 118) per se, that causes the temperature along the length, height, and width of the waveguide structure (106) to be substantially consistent.

A thermal barrier usually exists between two different materials. The thermal barrier is generally created by a region of lower thermal conductivity due to poor bonding, air gaps, and/or discontinuities between the materials. However, in examples where the over cladding (108) is made of diamond that is chemical vapor deposited directly onto the waveguide (106), a thermal barrier between the waveguide structure (106) and the over cladding (108) may be reduced and/or eliminated. Further, impurities within an over cladding (108) may also have a lower thermal conductance as well as introduce thermal barriers. Thus, in some examples, the over cladding is made of a pure material to keep the overall thermal conductivity of the over cladding high.

Initial simulation confirmed that a vapor deposited diamond over cladding in a circuit device similar to the example of FIG. 1 spreads heat generated with an electrical field throughout the volume of the diamond over cladding and substantially reduces the heat of the affected portions of the waveguide. The simulation compared a first circuit device with an over cladding made of silicon dioxide ($SiO_2$) having a thermal conductance of 1.3 W/((m)(-K)) and a second circuit device with an over cladding made of chemical vapor deposited diamond having a thermal conductance of 300 W/((m)(-K)). In each of the first and second circuit devices, the substrate was made of silicon and the base cladding was made of a silicon dioxide. The waveguide was also made of silicon and the electrodes were made of aluminum. In the experiment, both the first and the second heats sinks were arranged as in the example of FIG. 1 and were at a temperature of 300 Kelvin. An electrical field was generated with a single watt of electrical energy. The waveguide in the first circuit device with the $SiO_2$ over cladding was measured to be 325 Kelvin. On the other hand, the waveguide of the second circuit device with the diamond over cladding was measured to be 300.25 Kelvin.

Figure 2:
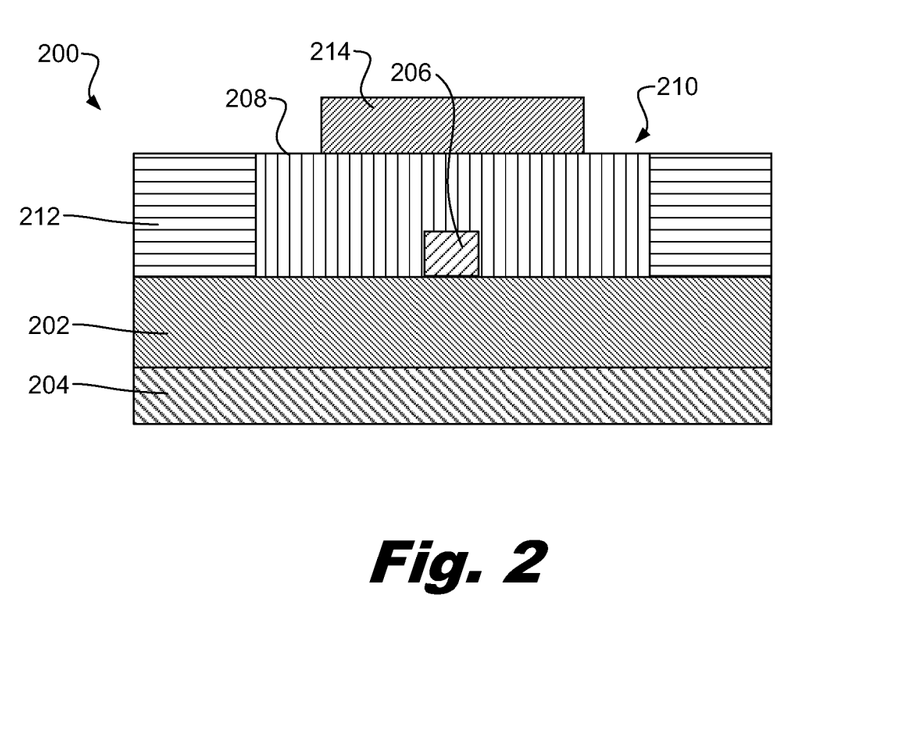
FIG. 2 is a diagram of an example of a circuit device according to principles described herein.

FIG. 2 is a diagram of an example of a circuit device (200) according to principles described herein. In this example, a base cladding (202) is formed over a substrate (204), and a waveguide (206) is formed over the base cladding (202). An over cladding (208) made of a highly thermally conductive material, such as diamond, aluminum nitride, beryllium oxide, another material, or combinations thereof, may be formed over the waveguide (206).

In the example of FIG. 2, the over cladding (208) covers just the region (210) proximate the waveguide (206) while another material (212) of a lower thermally conductivity is disposed above the base cladding (202) and adjacent to the over cladding (208). The material of lower thermal conductivity may be $SiO_2$. In some examples, material (212) is a thermal insulator that inhibits or slows heat transfer. In some examples, a thermal barrier between material (212) and the over cladding (208) is intentionally formed.

A heater (214) may be positioned adjacent to the over cladding, which may be used to control the temperature of the waveguide (206). The over cladding (208) may be a thermal guide that directs heat from the heater (214) towards the waveguide (206). In some examples, the optical properties of the waveguide's material are affected by its temperature. Thus, the heater (214) may be used to control the optical properties of the waveguide (206). The high thermal conductivity of the over cladding (208) may conduct the heat from the heater (214) to the waveguide (206).

The use of the over cladding's high thermal conductivity may lower the energy output of the heater (214) needed to increase the temperature of the waveguide (206). In some examples, enough thermally conductive material of the over cladding (208) is used to encapsulate the waveguide (206) and create a path from the heater (214) to the waveguide (206) to keep the over cladding's material to a minimum. In such an example, energy is not wasted on heating unnecessary over cladding material when changing the waveguide's temperature.

Material (212) may prevent the temperature changes intended for the waveguide (206) from affecting other waveguides formed on the base cladding (202). Thus, heater (214) may be isolated to control just waveguide (206) while other heaters are used to control the other waveguides.

Figure 3:
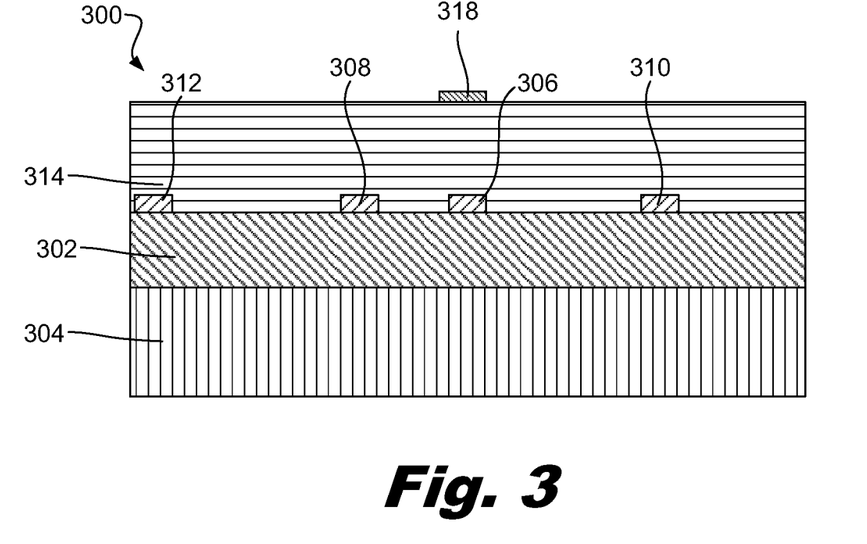
FIG. 3 is a diagram of an example of a circuit device according to principles described herein.

FIG. 3 is a diagram of an example of a circuit device (300) according to principles described herein. In this example, the circuit device (300) includes a base cladding (302) deposited over a substrate (304). Multiple waveguides (306, 308, 310, 312) are deposited over the base cladding (302) and a single over cladding (314) is deposited over the base cladding (302) such that the over cladding (314) fully encapsulates each of the waveguides (306, 308, 310, 312).

In this example, heat is added to the over cladding (314) with a heat source (318) adjacent to the over cladding (314). The heat source (318) may be another circuit component, a processor, a controller, a central processing unit, other device located close to the circuit device (300), a component of the circuit device (300), or combinations thereof. In some example, the heat source (318) is in direct contact with the over cladding (314), but in other examples, the heat source (318) is located a space away from the over cladding (314).

The over cladding (314) may be made of a high thermally conductive material that spreads heat from the heat source (318) throughout the volume of the over cladding (318). The over cladding's thermal properties may result in a substantially uniform distribution of the heat throughout the over cladding's volume. A substantially consistent temperature across each of the waveguides may contribute to consistent signals modulation across each of the waveguides.

Initial simulation confirms that the principles herein substantially distribute the heat from an external source as described. In the experiment, a first circuit device with a $SiO_2$ over cladding was compared to a second circuit device with a chemical vapor deposited diamond. In the experiment, the same external heat source was applied in the same location on the over cladding. The external heat source was applied directly above the waveguide (306), with waveguide (308) being the next closest to the waveguide (306). Next, waveguide (310) was third closest, and waveguide (312) was the furthest away. In the experiment, the substrate of both the first and the second circuit devices was measured at 300 Kelvin.

For the first circuit device of the experiment, waveguide (306) measured a temperature of 313.6 Kelvin, waveguide (308) measured 307.9 Kelvin, waveguide (310) measured 304.6 Kelvin, and waveguide (312) measured 304.1 Kelvin. Thus, the total temperature difference between waveguide (306) and waveguide (312) was 9.5 Kelvin. On the other hand, for the second circuit device with the diamond over cladding, waveguide (306) measured a temperature of 307.6 Kelvin, waveguide (308) measured 307.4 Kelvin, waveguide (310) measured 307.2 Kelvin, and waveguide (312) measured 307.2 Kelvin. Thus, the total temperature difference between waveguide (306) and waveguide (312) was 0.4 Kelvin. As demonstrated, the diamond over cladding substantially eliminated a hot spot by spreading the temperature increase substantially evenly throughout the volume of the over cladding.

Figure 4:
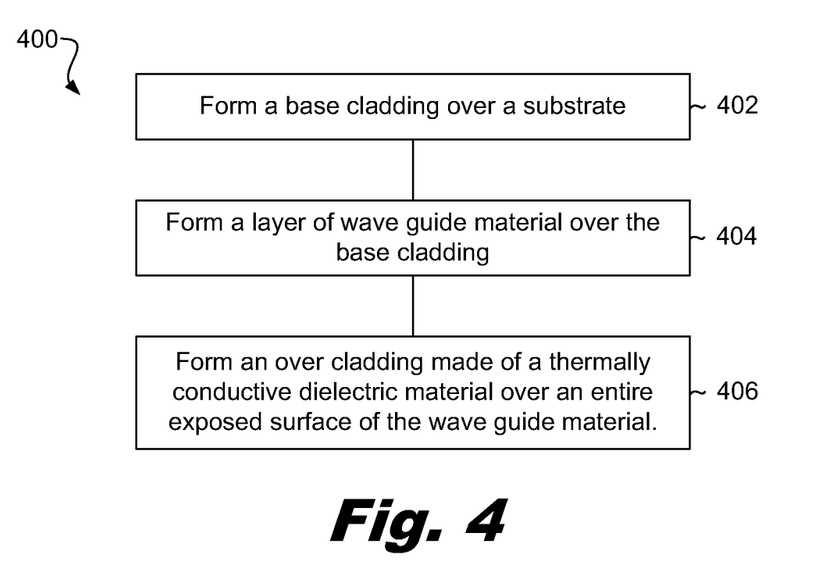
FIG. 4 is a diagram of an example of a method for forming a thermally controlled optical circuit according to principles described herein.

FIG. 4 is a diagram of an example of a method (400) for forming a thermally controlled optical circuit according to principles described herein. In this example, the method (400) includes forming (402) a base cladding over a substrate; forming (404) a layer of waveguide material over a base cladding, and forming (406) an over cladding made of a thermally conductive dielectric material over an entire exposed surface of the waveguide material.

In some examples, the method further includes removing a portion of the waveguide layer to form a waveguide prior to depositing the over cladding. In other examples, the depositing technique forms the waveguide with the appropriate end length and width. In other examples, the entire layer may be used as a single waveguide.

Figure 5:
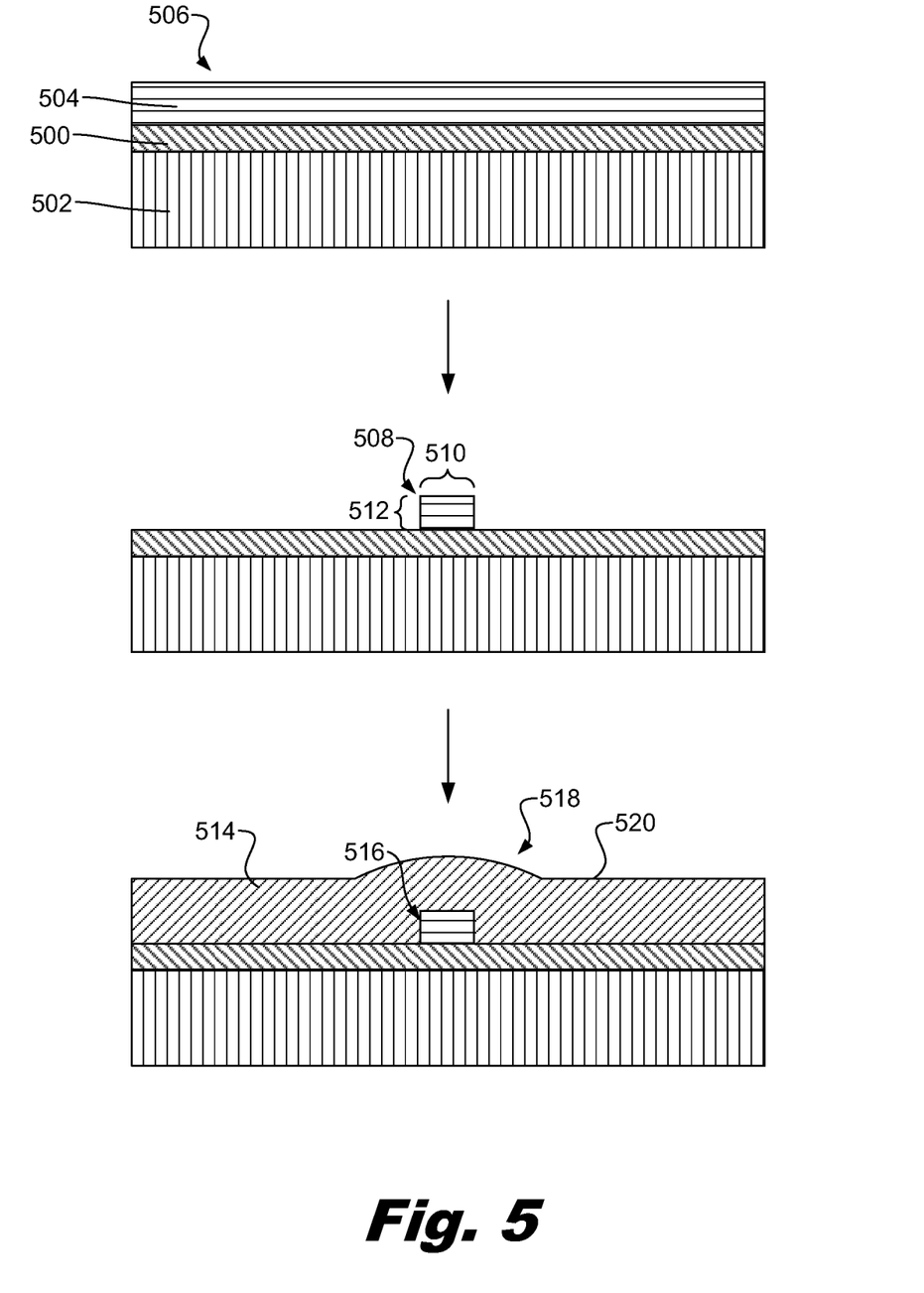
FIG. 5 is a diagram of an example of manufacturing an optical device according to principles described herein.

FIG. 5 is a diagram of an example of manufacturing an optical device according to principles described herein. In this example during the first stage, a base cladding (500) is deposited over a substrate (502). In some examples, the substrate (502) is made of silicon, but any substrate material compatible with the principles described herein may be used. The base cladding (500) may be made of silicon dioxide, a metal oxide, another material, or combinations thereof. In some examples, the base cladding has a thermal conductivity between 0.5 and 5.0 W/((m)(–K)). However, in other examples, the base cladding (500) may be made of other materials with a higher thermal conductivity.

A waveguide material (504) may be deposited on the base cladding (500). In some examples, the waveguide material (504) has a higher refractive index than the base cladding (500) or an over cladding that will be deposited on the waveguide material during a subsequent manufacturing stage. In some examples, the waveguide material (504) is a semiconductor material. For example, the waveguide material (504) may be made of silicon. In some examples, the waveguide material (504) is doped with ions, metals, compounds, other substances, or combinations thereof to cause the waveguide material (504) to be a semiconductor.

In a second stage of manufacturing, a portion of the layer (506) waveguide material (504) may be removed to form a waveguide (508). The portions that are removed may be removed through wet etching, dry etching, etching, grinding, other removal mechanisms, or combinations thereof. The dimensions of the waveguide (506) may be tailored for specific waveguide application. For example, the width (510) and height (512) of the waveguide (508) may affect the waveguide's refractive index. Further, the waveguide's dimensions may also affect the range of optical waves that may be transmitted through the waveguide (508).

In a third stage of manufacturing, an over cladding (514) may be deposited over the waveguide (508). The over cladding (514) may include a high thermal material. In some examples, the thermal conductivity is over a hundred watts per meter Kelvin. Such materials may include diamond, beryllium oxide, aluminum nitride, metal oxides, other materials, or combinations thereof. The over cladding (514) may fully encapsulate the entire waveguide (508) such that it prevents light from escape from along the waveguide's length, width (510), and height (512). In some examples, the over cladding (514) is deposited continuously on the exposed surfaces (516) of the waveguide (508) or the surfaces not in contact with the base cladding (500).

In some examples, a protrusion (518) in the surface (520) of the over cladding (514) is formed from the underlying waveguide (508). In some examples, the protrusion (518) is removed to make the surface (520) level for joining a heater, heat sink, other component, or combinations thereof of the circuit device. In some examples, the protrusion (518) is removed through etching, grinding, or a combination thereof. In examples where the over cladding (514) is hard, such as examples where the over cladding is made of a vapor deposited diamond, a diamond grit grinder may be used to remove the protrusion (518). In some examples, lasers or an electric discharge machining device may be used to remove the protrusion (518).

FIGS. 6-9 are diagram of examples of optical characteristics according to principles described herein. In some examples, a waveguide is in optical communication with a light source that puts the optical energy into the waveguide.

Such light sources may provide light with varying optical wavelengths, intensities, and other characteristics. In some examples, the light generated or passing through a resonator structure (e.g., microring, Fabry-Perot) that has a resonance cavity only allowing light with certain wavelengths to propagate inside the cavity. Wavelengths that are compatible with the resonance cavity are considered to be resonance wavelengths.

Generally, resonance wavelength in a resonator is a useful parameter in light manipulation. However, they are sensitive to the refractive index which is subject to temperature variation. On the other hand, resonance wavelengths in fabricated devices rarely match with desirable ones due to imperfect fabrication, and are required to be tuned actively. Therefore, the ideal situation is to use minimal effort to tune resonance wavelength and simultaneously minimize negative impact from resonator itself (i.e., device self-heating) and external environment (external temperature variation). In some examples, when the resonance mismatch is reduced, less tuning energy is used for compensating for the mismatch. In some examples, waveguides made according to the principles described herein reduce fabrication costs that would otherwise be spent on adjusting the mismatch because less alternation of the substrate and the waveguide are needed. FIGS. 6-9 demonstrate that initial simulation confirms that the higher thermal conductivity of the over cladding minimally alters the optical characteristics of the resonance wavelengths when certain dimensions are used.

Figure 6:
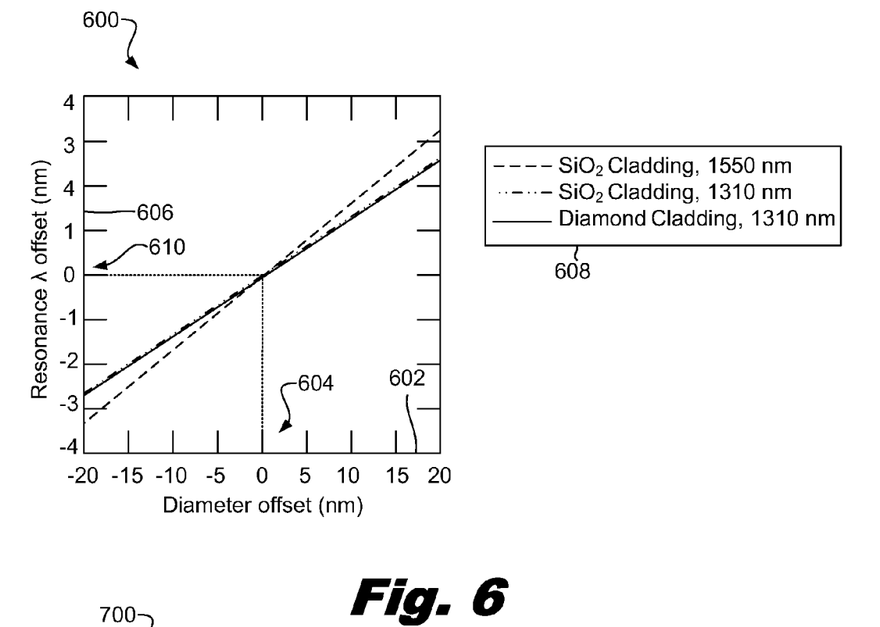
FIG. 6 is a diagram of an example of an optical characteristic according to principles described herein.

In the initial simulation, three optical devices were tested. The first optical device included a SiO$_2$ over cladding used with a resonance wavelength of 1550 nanometers. The second optical device included a SiO$_2$ over cladding used with a resonance wavelength of 1310 nanometers, and the third optical device included a diamond over cladding used with a resonance wavelength of 1310 nanometers. A change in a resonance wavelength may be expressed as follows:

$$\Delta\lambda_0 = \Delta n_{eff} \pi \Delta D/m,$$

where $\Delta\lambda_0$ represents a change in the resonance wavelength; $\Delta n_{eff}$ represents a change in the effective waveguide modal index, which is determined by refractive indices of the waveguide's material and the over cladding, and smaller difference between them results in smaller $\Delta n_{eff}$ at the same waveguide geometrical variation; $\Delta D$ represents the change in the microring's diameter, and m represents the order of resonance mode FIG. 6 is a diagram of an example of an optical characteristic according to principles described herein. In this example, the optical properties of the three optical devices are included in chart (600). In the chart (600), the x-axis (602) schematically represents a diameter of a microring resonator measured in nanometer offsets from a base microring diameter, which is schematically represented at zero (604). In the example of FIG. 6, the base microring diameter is ten micrometers. The y-axis (606) schematically represents a resonance wavelength offset. A legend (608) identifies which over cladding material is combined with which resonance wavelength. Zero (610) along the y-axis (606) indicates that the resonance wavelength is unaltered. So, for the first optical device, a base resonance wavelength is 1550 nanometers, while the base resonance wavelength for the second and third optical devices is 1310 nanometers.

In the chart of FIG. 6, each of the first, second, and third optical devices has substantially no change to the base resonance wavelength when the diameter of the mirroring is ten micrometers. When a 1310 nanometer resonance wavelength is used, the resonance wavelength changes are substantially the same regardless of whether a diamond over cladding or a SiO$_2$ over claddings are used. In the chart of FIG. 6, the larger wavelength of 1550 nanometers tends to experience a greater change as the base diameter changes.

Figure 7:
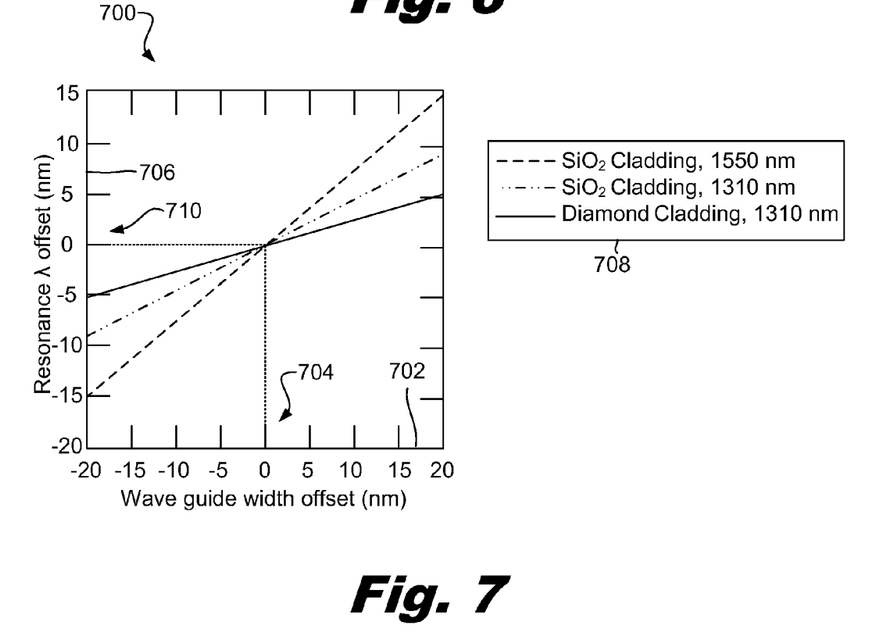
FIG. 7 is a diagram of an example of an optical characteristic according to principles described herein.

FIG. 7 is a diagram of an example of an optical characteristic according to principles described herein. In this example, the optical properties of the three optical devices are included in chart (700). In the chart (700), the x-axis (702) schematically represents a waveguide width offset measured in nanometer offsets from a base width, which is schematically represented at zero (704). In the example of FIG. 7, the base width is 500 nanometers. The y-axis (706) schematically represents a resonance wavelength offset. A legend (708) identifies which over cladding material is combined with which resonance wavelength. Zero (710) along the y-axis (706) indicates that the resonance wavelength is unaltered. So, for the first optical device a base resonance wavelength is 1550 nanometers, while the base resonance wavelength for the second and third optical devices is 1310 nanometers.

In the chart of FIG. 7, each of the first, second, and third optical devices has substantially no change to the base resonance wavelength when the waveguide width is 500 nanometers. When a 1310 nanometer resonance wavelength is used, the resonance wavelength changes more drastically when a SiO$_2$ over claddings is used than when a diamond over cladding is used. In the chart of FIG. 7, the larger wavelength of 1550 nanometers in a SiO$_2$ over cladding changes more drastically as the waveguide width changes.

Figure 8:
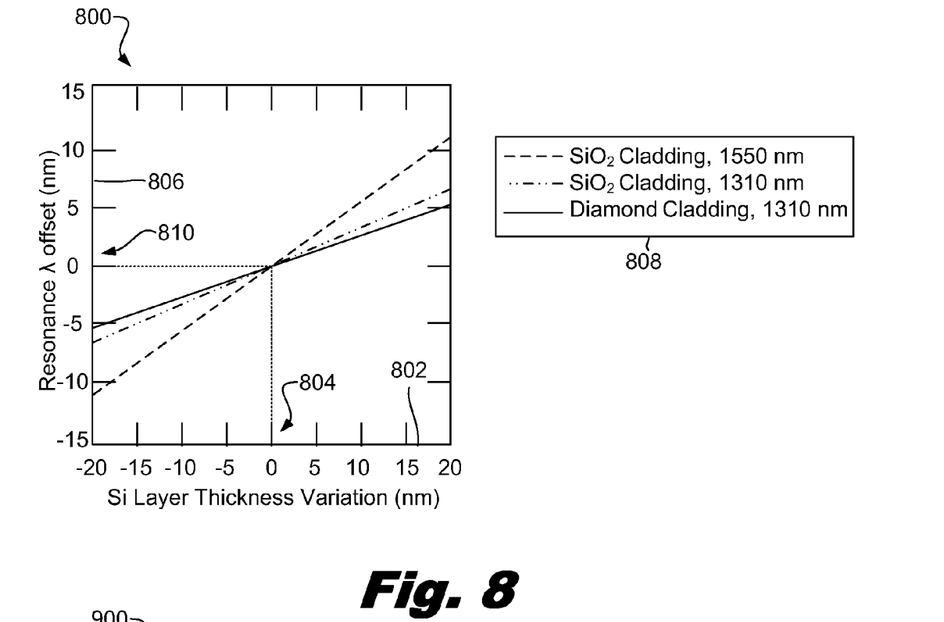
FIG. 8 is a diagram of an example of an optical characteristic according to principles described herein.

FIG. 8 is a diagram of an example of an optical characteristic according to principles described herein. In this example, the optical properties of the three optical devices are included in chart (800). In the chart (800), the x-axis (802) schematically represents a waveguide thickness measured in nanometer offsets from a base thickness, which is schematically represented at zero (804). In the example of FIG. 8, the base thickness is 250 nanometers. The y-axis (806) schematically represents a resonance wavelength offset. A legend (808) identifies which over cladding materials is combined with which resonance wavelength. Zero (810) along the y-axis (806) indicates that the resonance wavelength is unaltered. So, for the first optical device a base resonance wavelength is 1550 nanometers, while the base resonance wavelength for the second and third optical devices is 1310 nanometers.

In the chart of FIG. 8, each of the first, second, and third optical devices has substantially no change to the base resonance wavelength when the thickness of the waveguide is 250 nanometers. When a 1310 nanometer resonance wavelength is used, the resonance wavelength changes drastically more when a SiO$_2$ over claddings is used than when a diamond over cladding is used. In the chart of FIG. 8, the larger wavelength of 1550 nanometers in a SiO$_2$ over cladding changes more drastically as the waveguide width changes.

Figure 9:
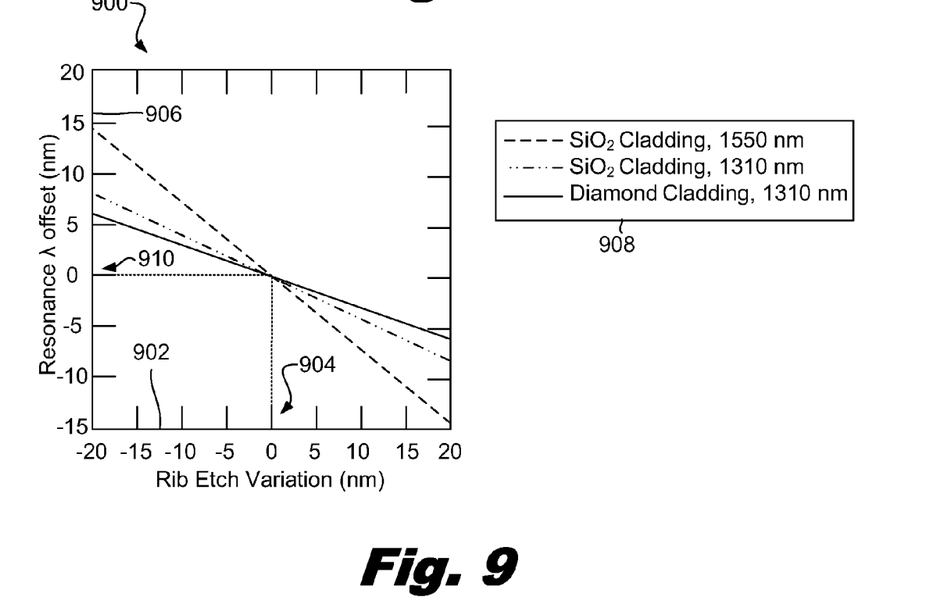
FIG. 9 is a diagram of an example of an optical characteristic according to principles described herein.

FIG. 9 is a diagram of an example of an optical characteristic according to principles described herein. In this example, the optical properties of the three optical devices are included in chart (900). In the chart (900), the x-axis (902) schematically represents an etching depth measured in nanometer offsets from a base depth, which is schematically represented at zero (904). In the example of FIG. 9, the base thickness is 250 nanometers that leaves 50 nanometer pedestal behind. The y-axis (906) schematically represents a resonance wavelength offset. A legend (908) identifies which over cladding materials is combined with which resonance wavelength. Zero (910) along the y-axis (906)

indicates that the resonance wavelength is unaltered. So, for the first optical device a base resonance wavelength is 1550 nanometers, while the base resonance wavelength for the second and third optical devices is 1310 nanometers.

In the chart of FIG. 9, each of the first, second, and third optical devices has substantially no change to the base resonance wavelength when the thickness of the waveguide is 250 nanometers. When a 1310 nanometer resonance wavelength is used, the resonance wavelength changes more drastically when a $SiO_2$ over claddings is used than when a diamond over cladding is used. In the chart of FIG. 9, the larger wavelength of 1550 nanometers in a $SiO_2$ over cladding changes more drastically as the waveguide width changes.

The charts (600, 700, 800, 900) from FIGS. 6-9 demonstrate shorter wavelengths tend to experience smaller changes when the dimensions of the waveguide are changed. Further, the charts (600, 700, 800, 900) demonstrate that a smaller change of effective waveguide modal index (determined by the waveguide's material's refractive index and the over cladding's refractive index) also tend to reduce the resonance wavelength changes as the dimensions of the waveguides change. And a smaller $\Delta n_{eff}$ is a consequence of a smaller difference between the waveguide's material's refractive index and the over cladding's refractive index under the same waveguide geometrical variation Further, the principles described herein may result is lower optical confinement in waveguides made of semiconductor material due to a small effective waveguide modal index. In some examples, the principles described herein also reduce a scattering loss that is generally attributed to waveguide side wall roughness, which is a function of the difference between the refractive index of the waveguide material and the refractive index of the over cladding.

Figure 10:
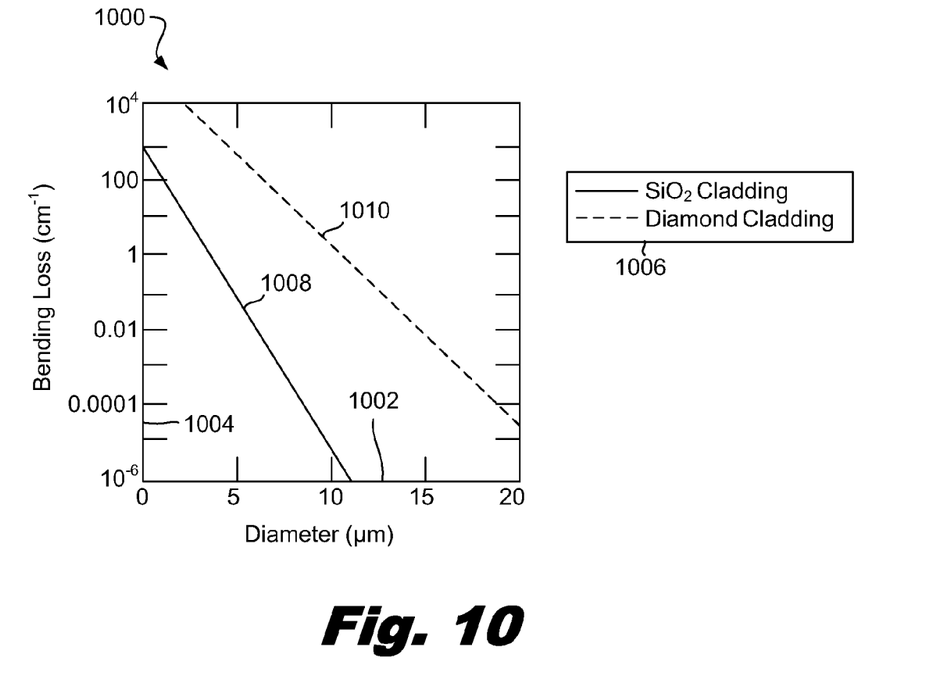
FIG. 10 is a diagram of an example of an optical characteristic according to principles described herein.

FIG. 10 is a diagram of an example of an optical characteristic according to principles described herein. In this example, an optical characteristic of energy loss from bending is presented in chart (1000). In this example, the x-axis (1002) schematically represents the diameter of a bend in the waveguide, and the y-axis (1004) schematically represents a loss of light energy measured in reciprocal centimeters. A legend (1006) identifies that a solid line (1008) schematically represents an optical device with a $SiO_2$ over claddings and a dashed line (1010) schematically represents an optical device with a diamond over cladding.

In chart (1000), lower level bending losses with diamond over claddings occur with bends of diameters over twenty micrometers and for $SiO_2$ over claddings with bends of diameters over ten micrometers. As the diameter of the bends increase, the energy loss decreases. As demonstrated in chart (1000), the energy loss occurs at very small bends. Bends that are large enough to prevent energy loss are adequate for many applications, thus, bending losses with a diamond over cladding or other highly thermally conductive material are negligent or manageable for many applications.

Figure 11:
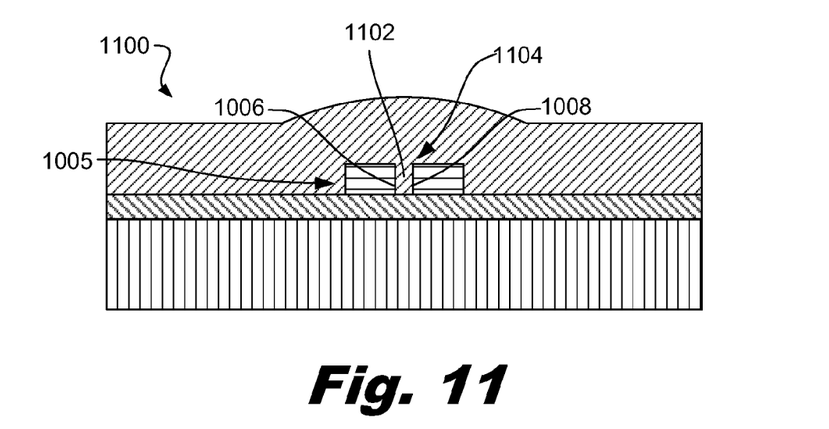
FIG. 11 is a diagram of an example of a circuit device according to principles described herein.

FIG. 11 is a diagram of an example of a circuit device (1100) according to principles described herein. In this example, the circuit device (1100) has a waveguide (1102) formed in a slot (1004) of a wave structure (1005) that has a first slot wall (1006) and a second slot wall (1008). In this example, the waveguide (1102) is made of vapor deposited diamond with a lower refractive index. Such an example allows for quantum optic applications. The circuit device in the example of FIG. 11, also allows for a smaller bending radius without bending losses. In some examples, the diamond is made to have nitrogen vacancy centers that may interact with the optical mode of the light wavelengths.

While the examples above have been described with reference to specific material and dimensions, any material or dimensions compatible with the principles described herein may be used. Further, while the above examples have been described with test results generated with specific structures, other structures that conform to the principles described herein may also be used, which may or may not yield similar results. Also, in the examples described above, the devices have been described with reference to specific applications; however, any applications compatible with the principles described herein may be used. For example, the principles described herein may be used for quantum optic applications, microelectronic applications, photonic applications, other applications, or combinations thereof. In some examples, systems that incorporate the circuit device and/or optical device may include computers, laptops, desktops, electronic tablets, processors, vehicles, instrumentation, monitors, microwaves, appliances, navigation systems, networks, telecommunications systems, phones, other systems, and combinations thereof.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A device for controlling temperatures in optical circuits, comprising:
    a waveguide structure located between a base cladding and an over cladding;
        said base cladding being deposited over a substrate; and
        said over cladding being made from diamond, having nitrogen vacancy centers, as a thermally conductive dielectric material.

2. The device of claim 1, wherein said thermally conductive dielectric material comprises a thermal conductivity higher than silicon dioxide.

3. The device of claim 1, wherein said thermally conductive dielectric material further comprises aluminum nitride, beryllium oxide, or combinations thereof.

4. The device of claim 1, wherein said thermally conductive dielectric material is in uniform contact with a top surface and each side surface of said waveguide structure.

5. The device of claim 1, wherein said waveguide structure is part of an optical integrated circuit incorporated in said device.

6. The device of claim 1, wherein said waveguide structure comprises a semiconductor material.

7. The device of claim 1, wherein said thermally conductive dielectric material passively reduces joule heating within said waveguide structure when said waveguide structure is subjected to an active electric field.

8. The device of claim 1, wherein said thermally conductive dielectric material is a thermal guide that directs heat from a heat source circuit component towards said waveguide structure.

9. The device of claim 1, wherein said over cladding is deposited over multiple waveguides and said thermally conductive dielectric material distributes heat from a heat source circuit component across said multiple waveguides.

10. A method for forming thermally controlled optical circuits, comprising:
    forming a base cladding over a substrate;
    forming a layer of waveguide material over said base cladding;

forming an over cladding made of diamond, having nitrogen vacancy centers, over an entire exposed surface of said waveguide material.

11. The method of claim 10, further comprising removing a portion of said layer of said waveguide material to form a waveguide prior to depositing said over cladding.

12. The method of claim 11, further comprising forming the over cladding over multiple waveguides.

13. The method of claim 12, further comprising forming a circuit component as a heat source above the multiple waveguides.

14. The method of claim 13, further comprising forming the heat source in a location to thermally control multiple waveguides.

15. A system, comprising:
an integrated circuit comprising:
a base cladding formed over a substrate;
a waveguide formed over said base cladding, where said waveguide comprises an outer surface; and
an over cladding made of diamond, having nitrogen vacancy centers, is formed continuously across said outer surface of said waveguide.

16. The system of claim 15, wherein said waveguide is located between a pair of electrodes that is electrically insulated from said waveguide with said over cladding.

17. The system of claim 15, where said diamond is a thermally conductive dielectric material that directs heat from a heat source circuit component towards said waveguide.

18. The system of claim 15, wherein said over cladding is deposited over multiple waveguides and said diamond is a thermally conductive dielectric material that distributes heat from hot spots across said multiple waveguides.

* * * * *

UNITED STATES PATENT AND TRADEMARK OFFICE
CERTIFICATE OF CORRECTION

PATENT NO. : 9,581,761 B2
APPLICATION NO. : 14/423804
DATED : February 28, 2017
INVENTOR(S) : Di Liang et al.

It is certified that error appears in the above-identified patent and that said Letters Patent is hereby corrected as shown below:

In the Specification

Column 1, Line 4, insert the following:
--STATEMENT OF GOVERNMENT RIGHTS
This invention was made with Government support under Contract No. H98230-12-C-0236 awarded by the Maryland Procurement Office. The Government has certain rights in this invention.--

Signed and Sealed this
Sixth Day of March, 2018

Andrei Iancu
*Director of the United States Patent and Trademark Office*